United States Patent
Lu et al.

(10) Patent No.: US 11,935,216 B2
(45) Date of Patent: Mar. 19, 2024

(54) VISION INSPECTION SYSTEM AND METHOD OF INSPECTING PARTS

(71) Applicants: TE Connectivity Services GmbH, Schaffhausen (CH); Tyco Electronics (Shanghai) Co., Ltd., Shanghai (CN)

(72) Inventors: Roberto Francisco-Yi Lu, Bellevue, WA (US); Sonny O. Osunkwo, Harrisburg, PA (US); Dandan Zhang, Shanghai (CN); Jiankun Zhou, Middletown, PA (US); Lei Zhou, Shanghai (CN)

(73) Assignees: Tyco Electronics (Shanghai) Co., Ltd. (CN); TE Connectivity Solutions GmbH (CH)

( * ) Notice: Subject to any disclaimer, the term of this patent is extended or adjusted under 35 U.S.C. 154(b) by 453 days.

(21) Appl. No.: 16/940,778

(22) Filed: Jul. 28, 2020

(65) Prior Publication Data

US 2021/0379624 A1   Dec. 9, 2021

(30) Foreign Application Priority Data

Jun. 3, 2020   (CN) .......................... 202010493394.4

(51) Int. Cl.
*G06T 5/40* (2006.01)
*B07C 5/342* (2006.01)
(Continued)

(52) U.S. Cl.
CPC ............... *G06T 5/40* (2013.01); *B07C 5/342* (2013.01); *G01N 21/8851* (2013.01);
(Continued)

(58) Field of Classification Search
CPC ..... G06T 7/0004; G06T 7/001; G06T 7/0002; G06T 7/0012; G06T 7/20; G06T 7/0006;
(Continued)

(56) References Cited

U.S. PATENT DOCUMENTS 11,182,886 B2 * 11/2021 Cho ........................ G06T 5/009
11,461,894 B2 * 10/2022 Odagiri ................. G06T 7/0012
(Continued)

FOREIGN PATENT DOCUMENTS

RU           2716465 C1 *  3/2020  ........... G01N 21/896
WO   WO-2019211846 A1 * 11/2019  ......... G01N 21/8851

*Primary Examiner* — Ian L Lemieux
*Assistant Examiner* — Woo C Rhim (57) ABSTRACT

A vision inspection system includes a sorting platform having an upper surface supporting parts for inspection. An inspection station is positioned adjacent the sorting platform including an imaging device to image the parts in a field of view. A vision inspection controller receives images from the imaging device. The vision inspection controller includes an image histogram tool to pre-process the images to improve contrast of the images by redistributing lightness values of the images based on adaptive histogram equalization processing to generate enhanced images. The vision inspection controller processes the enhanced images based on an image analysis model to determine inspection results for each of the parts. The vision inspection controller has an artificial intelligence learning module operated to customize and configure the image analysis model based on the enhanced images.

20 Claims, 4 Drawing Sheets

(51) Int. Cl.
  *G01N 21/88* (2006.01)
  *G06F 18/21* (2023.01)
  *G06T 5/00* (2006.01)
  *G06T 7/00* (2017.01)
  *G06V 10/20* (2022.01)
  *G06V 30/10* (2022.01)

(52) U.S. Cl.
  CPC .............. *G06F 18/21* (2023.01); *G06T 5/009* (2013.01); *G06T 7/0004* (2013.01); *G06V 10/255* (2022.01); *G06V 30/10* (2022.01); *B07C 2501/0063* (2013.01); *G01N 2021/8887* (2013.01); *G06T 2200/28* (2013.01); *G06T 2207/20081* (2013.01); *G06V 2201/06* (2022.01)

(58) Field of Classification Search
  CPC ......... G06T 7/11; G06T 7/0008; G06T 7/246; G06T 7/73; G06T 7/90; G06T 1/20; G06T 19/006; G06T 7/00; G06T 7/0014; G01N 21/8851; G01N 21/8806; G06K 9/6256; G06K 9/00; G06K 9/6269; G06K 9/6267; G06K 9/6215; G06K 9/6201; G06K 9/6217; G06K 9/6293; G06K 9/6257; G06K 9/6227; G06V 40/103; G06V 20/52; G06V 40/10; G06V 10/462; G06V 20/584; G06V 20/41; G06V 10/56; G06V 20/10; G06V 20/53; G06V 20/00; G06V 40/161; G06F 16/5838; G06F 16/583; G06F 3/017; G06N 3/0454; G06N 3/08

See application file for complete search history.

(56) References Cited

U.S. PATENT DOCUMENTS

| | | | |
|---|---|---|---|
| 2017/0270664 A1* | 9/2017 | Hoogi | A61B 6/5217 |
| 2018/0374203 A1* | 12/2018 | Xiao | G06T 7/90 |
| 2019/0030571 A1* | 1/2019 | Horowitz | B07C 5/36 |
| 2019/0147586 A1* | 5/2019 | Ikeda | G06T 7/0004 |
| | | | 382/157 |
| 2019/0180097 A1* | 6/2019 | Ferguson | G06N 7/005 |
| 2019/0180430 A1* | 6/2019 | Lin | G06T 7/001 |
| 2019/0210067 A1* | 7/2019 | Kumar | G06V 10/46 |
| 2020/0349875 A1* | 11/2020 | Wen | G09G 3/006 |
| 2020/0360968 A1* | 11/2020 | Nygaard | B07C 5/3416 |
| 2021/0056681 A1* | 2/2021 | Hyatt | G05B 19/41875 |
| 2021/0178432 A1* | 6/2021 | Zeng | B07C 5/3422 |

* cited by examiner

VISION INSPECTION SYSTEM AND METHOD OF INSPECTING PARTS

CROSS REFERENCE TO RELATED APPLICATIONS

This application claims benefit to Chinese Application No. 202010493394.4, filed 3 Jun. 2020, the subject matter of which is herein incorporated by reference in its entirety.

BACKGROUND OF THE INVENTION

The subject matter herein relates generally to vision inspection systems.

Inspection systems are used for inspecting parts during a manufacturing process. Conventional inspection systems use personnel to manually inspect parts, such as to identify defective parts. Such manual inspection systems are labor intensive and high cost. The manual inspection systems have low detection accuracy leading to poor product consistency. Additionally, manual inspection systems suffer from human error due to fatigue, such as missed defects, wrong counts, misplacing of parts, and the like. Some known inspection systems use machine vision for inspecting parts. The machine vision inspection systems use cameras to image the parts. Image quality is a problem with known machine vision inspection systems. For example, poor image quality due to poor image contrast, poor image brightness, and the like result in poor system performance and faulty inspection. Some imaging systems image the parts multiple times at different brightness levels for analysis. However, imaging the parts multiple times results in slow throughput.

A need remains for a vision inspection system that may be operated in a cost effective and reliable manner.

BRIEF DESCRIPTION OF THE INVENTION

In one embodiment, a vision inspection system is provided. The vision inspection system includes a sorting platform having an upper surface supporting parts for inspection. An inspection station is positioned adjacent the sorting platform. The inspection station includes an imaging device to image the parts in a field of view above the upper surface. A vision inspection controller receives images from the imaging device. The vision inspection controller includes an image histogram tool to pre-process the images to improve contrast of the images by redistributing lightness values of the images based on adaptive histogram equalization processing to generate enhanced images. The vision inspection controller processes the enhanced images based on an image analysis model to determine inspection results for each of the parts. The vision inspection controller has an artificial intelligence learning module operated to customize and configure the image analysis model based on the enhanced images.

In another embodiment, a vision inspection system is provided. The vision inspection system includes a sorting platform having an upper surface supporting parts for inspection. An inspection station is positioned adjacent the sorting platform. The inspection station includes an imaging device to image the parts in a field of view above the upper surface. A vision inspection controller receives images from the imaging device. The vision inspection controller includes an image histogram tool pre-processing the images to improve contrast of the images. The image histogram tool generates a histogram. The image histogram tool computes a cumulative distribution function based on the histogram. The image histogram tool calculates enhanced lightness values of the images based on the cumulative distribution function to generate enhanced images. The vision inspection controller includes a shape recognition tool processing the enhanced images based on an image analysis module to determine inspection results for each of the parts. The vision inspection controller has an artificial intelligence learning module operated to customize and configure the image analysis model based on the enhanced images.

In a further embodiment, a method of inspecting parts is provided. The method loads the parts on an upper surface of a sorting platform. The method images the parts at an inspection station positioned adjacent the sorting platform using an imaging device to image the parts on the upper surface. The method receives images from the imaging device at a vision inspection controller having an image histogram tool and a shape recognition tool. The method pre-processes the images using the image histogram tool to improve contrast of the images by redistributing lightness values of the images based on adaptive histogram equalization processing to generate enhanced images. The method processes the enhanced images using the shape recognition tool based on an image analysis module to determine inspection results for each of the parts and customizes the image analysis model using an artificial intelligence learning module to configure the image analysis model based on the enhanced images.

DETAILED DESCRIPTION OF THE INVENTION

Figure 1:
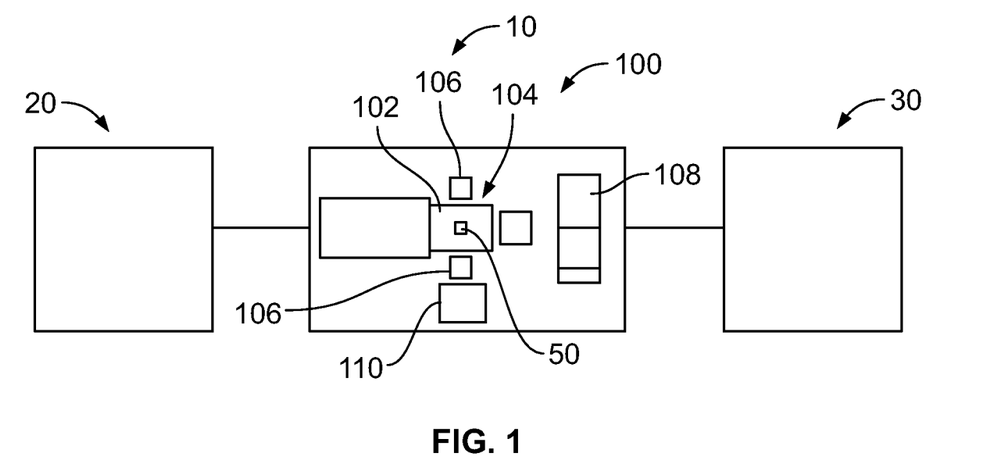
FIG. 1 is a schematic illustration of a machine for manufacturing parts having a vision inspection system in accordance with an exemplary embodiment.

FIG. 1 is a schematic illustration of a machine 10 for manufacturing parts 50, such as parts used in electrical connectors. For example, the parts 50 may be contacts, housings, circuit boards, or other types of parts. The machine 10 may be used for manufacturing parts used in other industries. The machine 10 includes one or more forming machines 20 used to form various parts 50. For example, the forming machines 20 may include a molding machine, a press, a lathe, and the like. The machine 10 includes a vision inspection system 100 used to inspect the various parts 50. The machine 10 includes one or more processing machines 30 used for processing the various parts 50. For example, the processing machines 30 may include assembly machines, packaging machines, and the like. For example, in various embodiments, the parts 50 may be assembled, such as at an assembly station, prior to packaging, such as at a packing station. The parts 50 are transported between the forming machines 20 and the vision inspection system 100. The vision inspection system 100 is used for quality inspection of the parts 50 and removes defective parts for scrap or further inspection. The acceptable parts 50 that have passed inspection by the vision inspection system 100 are transported between the vision inspection system 100 and the processing machines 30.

The vision inspection system 100 includes a sorting platform 102 that supports the parts 50 through the vision inspection system 100. The sorting platform 102 may be used to feed or move the parts 50 through the vision inspection system 100. In an exemplary embodiment, the parts 50 may be loaded onto the sorting platform 102 in any random orientation (for example, facing forward, facing rearward, facing sideways, and the like). The sorting platform 102 is able to support the parts without the need for fixturing, which increases the throughput of the parts 50 through the vision inspection system 100.

The vision inspection system 100 includes an inspection station 104 having one or more imaging devices 106 that image the parts 50 on the sorting platform 102 within a field of view of the imaging device(s) 106. In the illustrated embodiment, the vision inspection system 100 includes multiple imaging devices 106 for imaging different sides of the parts 50. Optionally, all sides (for example, top, bottom, front, rear, first side and second side) may be imaged with the multiple imaging devices 106. The imaging device 106 is able to image the parts 50 in the random orientations. In an exemplary embodiment, the vision inspection system 100 may be used to inspect different types of parts 50. For example, the vision inspection system 100 may be used to inspect different sized parts, different shaped parts, parts in different orientations, and the like.

The vision inspection system 100 includes a vision inspection controller 108 that receives the images from the imaging device 106 and processes the images to determine inspection results. For example, the vision inspection controller 108 determines if each part 50 passes or fails inspection. The vision inspection controller 108 may reject parts 50 that are defective. In an exemplary embodiment, the vision inspection controller 108 includes a pre-processing module for pre-processing the image and a processing module for processing the pre-processed image. For example, the pre-processing module may perform image enhancement prior to processing. The pre-processing module may provide contrast improvement of the images.

In an exemplary embodiment, the pre-processing of the vision inspection controller 108 is performed by an image histogram tool. The image histogram tool generates a histogram of the pixels of the image, computes a cumulative distribution function based on the histogram, and calculates enhanced lightness values of the pixels of the image based on the cumulative distribution function to generate an enhanced image. The image histogram tool redistributes lightness values of the pixels of the image for improved contrast of the image.

The enhanced images are processed by the vision inspection controller 108 based on an image analysis model. In an exemplary embodiment, the vision inspection controller 108 includes a shape recognition tool configured to recognize the parts 50 in the field of view on the sorting platform 102. The shape recognition tool processes the enhanced image, enhanced by the pre-processing performed by the image histogram tool. The images may be processed by performing pattern recognition of the enhanced images based on the image analysis model. The shape recognition tool may compare shapes, patterns or features in the enhanced images to shapes, patterns or features in the image analysis model. The images may be processed by performing feature extraction of boundaries and surfaces detected in the images and comparing the boundaries and surfaces to the image analysis model. The vision inspection controller 108 may identify lines, edges, bridges, grooves, or other boundaries or surfaces within the image. The pre-processing of the images provides image contrast enhancement for improved boundary or surface identification. The vision inspection controller 108 may be used for optical character recognition (OCR) of features in the image. For example, the shape recognition tool may be used for OCR.

In an exemplary embodiment, the vision inspection controller 108 includes an artificial intelligence (AI) learning module used to customize and configure image analysis based on the images received from the imaging device 106 and/or the enhanced images having contrast enhancement from the image histogram tool. The vision inspection controller 108 may be updated and trained in real time during operation of the vision inspection system 100. For example, the AI learning module may update and train the vison inspection controller 108 in real time during operation of the vision inspection system 100.

The vision inspection system 100 includes a sorting device 110 for sorting the parts 50 based on the inspection results. For example, the sorting device 110 may separate the acceptable parts from the defective parts. The sorting device 110 may be a multi-axis robot manipulator configured to grip and pick the parts off of the sorting platform 102. In other various embodiments, the sorting device 110 may include a pusher or ejector configured to push the acceptable and/or the defective parts off of the sorting platform 102.

Figure 2:
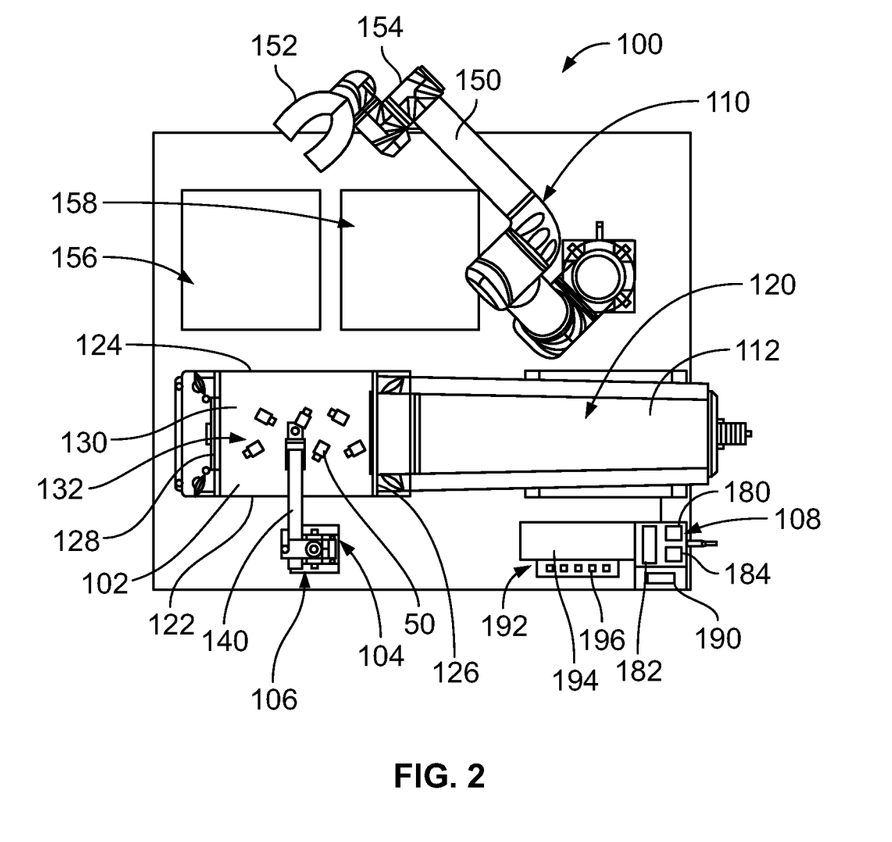
FIG. 2 is a top view of the vision inspection system in accordance with an exemplary embodiment.

FIG. 2 is a top view of the vision inspection system 100 in accordance with an exemplary embodiment. The vision inspection system 100 includes the sorting platform 102, the inspection station 104, the vision inspection controller 108, and the sorting device 110. In an exemplary embodiment, the vision inspection system 100 includes a part feeding device 112. The parts 50 are loaded onto the sorting platform 102 by the part feeding device 112, which may include a hopper, a conveyor, a robot, or another type of feeding device. The parts 50 are presented to the inspection station 104 on the sorting platform 102. The parts 50 may be advanced or fed along the sorting platform 102 to or through the inspection station 104 for inspection of the parts 50. The parts may be advanced along the sorting platform 102, such as in a linear advancing direction or in a rotated advancing direction. The parts 50 are removed from the sorting platform 102 by the sorting device 110.

In an exemplary embodiment, the part feeding device 112 includes a bin 120 for holding a supply of the parts 50. The parts 50 are fed from the bin 120 to the sorting platform 102, such as by a hopper or conveyor. The parts 50 may be guided to a particular location of the sorting platform 102, such as proximate to a center of the sorting platform 102 between a first side 122 and a second side 124 of the sorting platform 102. The parts 50 may be loaded onto the sorting platform 102, such as proximate to a rear 126 of the sorting platform 102, and advanced forward by or on the sorting platform 102 toward the front 128 of the sorting platform 102. Other types of part feeding devices 112 may be provided in alternative embodiments, such as a rotatable plate.

The sorting platform 102 includes a plate 130 having an upper surface 132 used to support the parts 50. The plate 130 may be a vibration tray that is vibrated to advance the parts 50 from the rear 126 toward the front 128. The plate 130 may be rectangular. However, the plate 130 may have other shapes in alternative embodiments, such as a round shape.

The inspection station 104 includes one or more imaging devices 106 (a single imaging device 106 is illustrated in FIG. 2) arranged adjacent the sorting platform 102. The imaging device 106 may be located above the upper surface 132 and view the parts 50 arranged on the upper surface 132. The imaging device 106 may be a camera, such as a visible light camera, an infrared camera, and the like. The field of view of the imaging device 106 may be approximately centered between first and second sides 122, 124 of the sorting platform 102. The field of view of the imaging device 106 may be approximately centered between the rear 126 and the front 128 of the sorting platform 102.

In an exemplary embodiment, the imaging device 106 is mounted to a position manipulator 140 for moving the imaging device 106 relative to the sorting platform 102. The position manipulator 140 may be an arm or a bracket that supports the imaging device 106. In various embodiments, the position manipulator 140 may be positionable in multiple directions, such as in two-dimensional or three-dimensional space. The position manipulator 140 may be automatically adjusted, such as by a controller that controls positioning of the position manipulators 140. In other various embodiments, the position manipulator 140 may be manually adjusted. The position of the imaging device 106 may be adjusted based on the types of parts 50 being imaged. For example, when a different type of part 50 is being imaged, the imaging device 106 may be moved based on the type of part being imaged.

The sorting device 110 is positioned adjacent the sorting platform 102. The sorting device 110 may be used to separate acceptable parts from defective parts based on input from the imaging device 106. In an exemplary embodiment, the sorting device 110 includes a robot arm 150 and a gripper 152 at a distal end 154 of the robot arm 150. In various embodiments, the robot arm 150 is a four-axis robot arm or a six-axis robot arm. Other types of robot arms 150 may be used in alternative embodiments. The parts 50 are picked off of the sorting platform 102 by the gripper 152. The sorting device 110 is operated to remove the parts 50 from the sorting platform 102, such as the acceptable parts and/or the defective parts. The parts 50 may be moved to collection bins, such as a first collection bin 156 for the acceptable parts and a second collection bin 158 for the defective parts. In various embodiments, the sorting device 110 is operated to remove all of the parts and place each of the parts in the corresponding collection bin 156, 158. In other various embodiments, the sorting device 110 is operated to remove only the acceptable parts to the first collection bin 156, leaving the defective parts to be dropped into the second collection bin 158 (located at the front 128 of the sorting platform 102) as the parts 50 are advanced in the feed direction. In other various embodiments, the sorting device 110 is operated to remove only the defective parts to the second collection bin 158, leaving the acceptable parts to be dropped into the first collection bin 156 (located at the front 128 of the sorting platform 102) as the parts 50 are advanced in the feed direction. Other types of part removal devices may be used in alternative embodiments, such as pushers, ejectors, and the like.

The vision inspection controller 108 is operably coupled to the imaging device 106 and the sorting device 110 for controlling operation of the sorting device 110. The imaging device 106 communicates with the vision inspection controller 108 through machine vision software to process the data, analyze results, record findings, and make decisions based on the information. The vision inspection controller 108 provides consistent and efficient inspection automation. The vision inspection controller 108 determines the quality of manufacture of the parts 50, such as determining if the parts 50 are acceptable or are defective. The vision inspection controller 108 identifies defects in the parts, when present. The vision inspection controller 108 may perform OCR on the images during part inspection. The vision inspection controller 108 may determine the orientations of the parts 50. The vision inspection controller 108 controls operation of the sorting device 110 based on the identified orientation of the parts 50.

The vision inspection controller 108 receives the images from the imaging device 106 and processes the images to determine inspection results. In an exemplary embodiment, the vision inspection controller 108 performs pre-processing of the images to enhance contrast and/or brightness of the images prior to processing the images. The vision inspection controller 108 includes an image histogram tool 180 for improving the contrast of the images. The pre-processing of the image reduces noise in the image. In an exemplary embodiment, the image histogram tool 180 pre-processes the images to improve contrast of the images by redistributing lightness values of the images based on adaptive histogram equalization processing to generate enhanced images. For example, the image histogram tool 180 may use contrast limited adaptive histogram equalization processing to improve image contrast and enhance the image compared to the original images received from the imaging device 106. In an exemplary embodiment, the image histogram tool 180 performs local contrast image enhancement on different areas of the image to generate an enhanced image. For example, the image histogram tool 180 may compartmentalize the image into smaller areas or tiles and perform the adaptive histogram equalization function to each of the tiles to generate the enhanced image. The image histogram tool 180 may use a cumulative distribution function to redistribute the lightness values of the image. The image histogram tool 180 reduces the effects of lighting variation in the images. The image histogram tool 180 improves image contrast to make shape recognition and/or OCR of the image more robust and effective.

The vision inspection controller 108 includes one or more processors 182 for processing the images. The vision inspection controller 108 determines if each part 50 passes or fails inspection. The vision inspection controller 108 controls the sorting device 110 to remove the parts 50, such as the acceptable parts and/or the defective parts, into the collection bins 156, 158. In an exemplary embodiment, the vision inspection controller 108 includes a shape recognition tool 184 configured to inspection the parts 50 in the field of view. The shape recognition tool 184 processes the image based on an image analysis model. The images are compared to the image analysis model to determine if the part 50 has any defects. The images may be processed to detect short shot defects, flash defects, black dots, dirt, dents, scratches, or other types of defects. The images may be processed by performing pattern recognition of the images based on the image analysis model. For example, the shape recognition tool 184 compares patterns or features in the images to patterns or features in the image analysis model. The images may be processed by performing feature extraction of boundaries and surfaces detected in the images and comparing the boundaries and surfaces to the image analysis model. The vision inspection controller 108 may identify lines, edges, bridges, grooves, or other boundaries or surfaces within the image. The vision inspection controller 108 may be used for OCR of features in the image. The vision inspection controller 108 may identify areas of interest within the image for enhanced processing. The vision inspection controller 108 may perform image segmentation during processing.

In an exemplary embodiment, the vision inspection controller 108 includes an artificial intelligence (AI) learning module 190. The AI learning module 190 uses artificial intelligence to train the vision inspection controller 108 and improve inspection accuracy of the vision inspection controller 108. The AI learning module 190 customizes and configures image analysis based on the images received from the imaging device 106 and/or the enhanced images that are processed using the image histogram tool 180. The vision inspection controller 108 is updated and trained in real time during operation of the vision inspection system 100. The AI learning module 190 of the vision inspection controller 108 may be operable in a learning mode to train the vision inspection controller 108 and develop the image analysis model. The image analysis model changes over time based on input from the AI learning module 190 (for example, based on images of the parts 50 taken by the imaging device 106).

In an exemplary embodiment, the vision inspection controller 108 includes a user interface 192. The user interface 192 includes a display 194, such as a monitor. The user interface 192 includes one or more inputs 196, such as a keyboard, a mouse, buttons, and the like. An operator is able to interact with the vision inspection controller 108 with the user interface 192.

Figure 3:
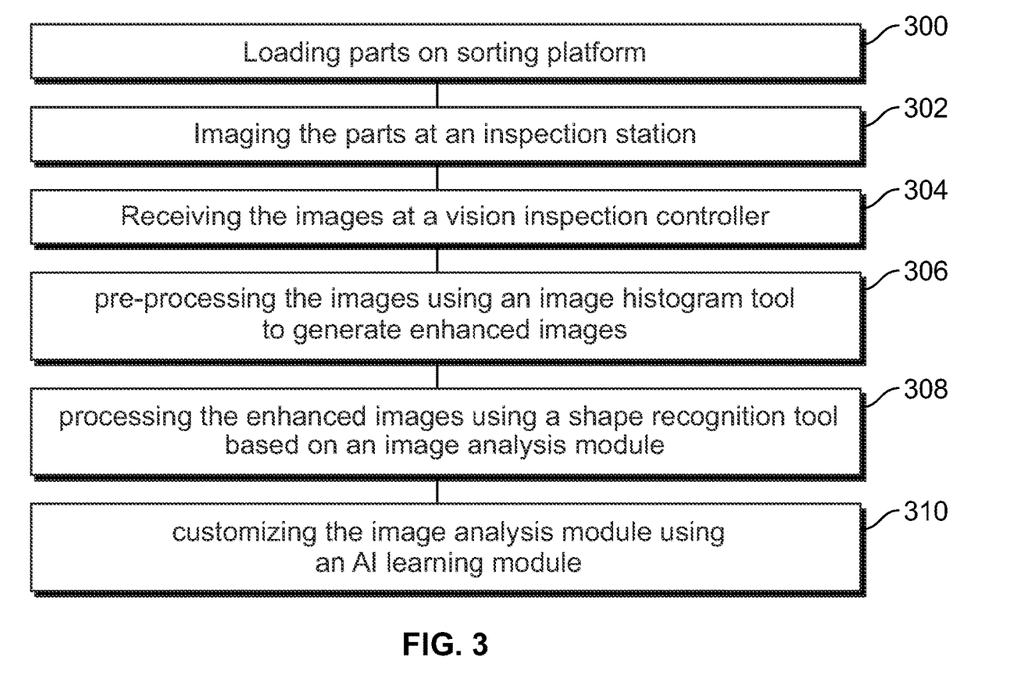
FIG. 3 is a flow chart showing a method of inspecting parts in accordance with an exemplary embodiment.

FIG. 3 is a flow chart showing a method of inspecting parts in accordance with an exemplary embodiment. The method, at 300, includes loading the parts 50 on the sorting platform 102. The parts 50 may be loaded manually or automatically. The parts 50 may be loaded on the upper surface 132 of the sorting platform 102.

At 302, the method includes imaging the parts at an inspection station 104 using the imaging device 106. The imaging device 106 may be located directly above the sorting platform 102 to view the parts 50. The imaging may be performed quickly and efficiently using the imaging device 106. At 304, the method includes receiving the images from the imaging device 106 at the vision inspection controller 108.

At 306, the method includes pre-processing the images using an image histogram tool 180 to improve contrast of the images and generate enhanced images. The image histogram tool 180 enhances contrast and/or brightness of the images prior to processing the enhanced images. The images may be pre-processed by the image histogram tool 180 by redistributing lightness values of the images. The pre-processing of the image reduces noise in the image. The images may be pre-processed by the image histogram tool 180 using adaptive histogram equalizing processing. The image histogram tool 180 may use contrast limited adaptive histogram equalization processing to improve image contrast and enhance the image compared to the original images received from the imaging device 106. In an exemplary embodiment, the image histogram tool 180 performs local contrast image enhancement on different areas of the image to generate the enhanced image. For example, the image histogram tool 180 may compartmentalize the image into smaller areas or tiles and perform the adaptive histogram equalization function to each of the tiles to generate the enhanced image. The image histogram tool 180 may use a cumulative distribution function to redistribute the lightness values of the image. In an exemplary embodiment, the image histogram tool 180 may pre-process the image by generating a histogram based on the image, computing a cumulative distribution function based on the histogram, and calculating enhanced lightness values of the images based on the cumulative distribution function to generate the enhanced images.

At 308, the method includes processing the pre-processed, enhanced images using a shape recognition tool 184 of the vision inspection controller 108. The shape recognition tool 184 may process the images based on an image analysis model to determine inspection results for the parts. In various embodiments, the images are processed by comparing the image to the image analysis model to determine if the part 50 has any defects. In various embodiments, the images are processed by performing pattern recognition of the images based on the image analysis model. In various embodiments, the images are processed by performing feature extraction of boundaries and surfaces detected in the images and comparing the boundaries and surfaces to the image analysis model. The shape recognition tool 184 may process the enhanced images by performing OCR on the enhanced image.

At 310, the method includes customizing the image analysis model using the AI learning module 190 to configure the image analysis model based on the images received from the imaging device 106 and/or based on the enhanced images pre-processed by the image histogram tool 180. The AI learning module 190 uses the data from the image to train the vision inspection controller 108 and improve inspection accuracy of the vision inspection controller 108. The image analysis model is updated based on the images from the imaging device 106. The AI learning module 190 customizes and configures image analysis based on the images received from the imaging device 106 and/or based on the enhanced images pre-processed by the image histogram tool 180. The vision inspection controller 108 is updated and trained in real time during operation of the vision inspection system 100 based on the image or the enhanced image. The image analysis model changes over time based on input from the AI learning module 190, such as based on the images taken by the imaging device 106 and/or based on the enhanced images pre-processed by the image histogram tool 180.

Figure 4:
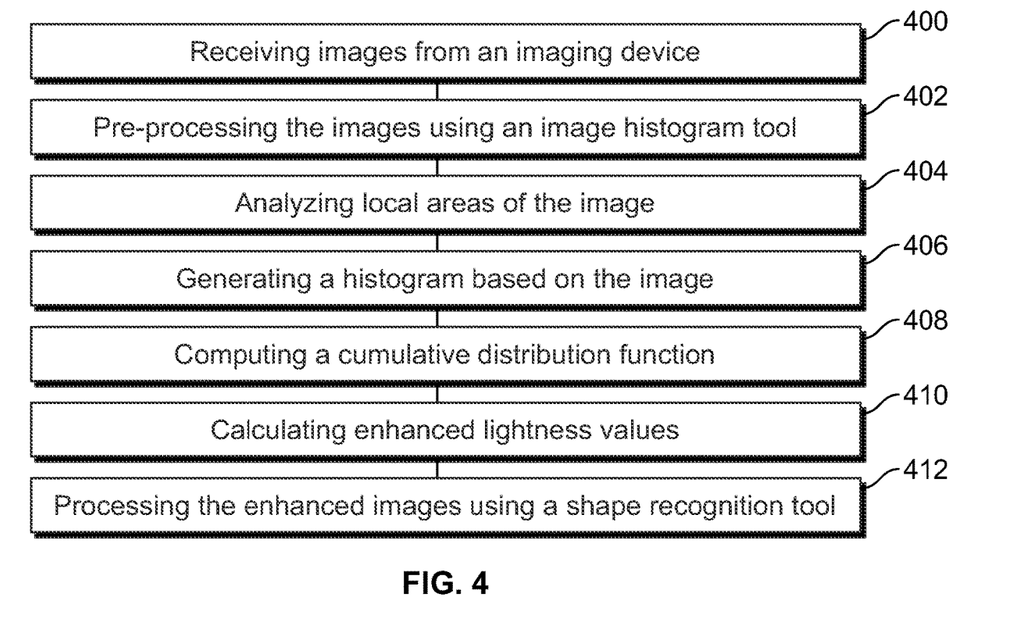
FIG. 4 is a flow chart showing a method of processing images in accordance with an exemplary embodiment.

FIG. 4 is a flow chart showing a method of processing images in accordance with an exemplary embodiment. The method, at 400, includes receiving images from an imaging device 106. The images may be received at a vision inspection controller 108 having an image histogram tool and a shape recognition tool. The images may be of parts for inspection of the parts, such as to determine if parts are defective.

At 402, the method includes pre-processing the images using the image histogram tool 180 to improve contrast of the images and generate enhanced images. Pre-processing the images using the image histogram tool 180 includes the step of analyzing 404 local areas or tiles of the image. For example, the image may be analyzed using a window, such as an 8×8 window (or other sized window), for local image analysis. The image histogram tool 180 may slide the window across the entire image such that all areas of the image are analyzed. The windows or tiles may overlap such that areas are analyzed in multiple tiles.

Pre-processing the images using the image histogram tool 180 includes the step of generating 406 a histogram based on the image. The histogram is a graph of pixel intensity versus the number of pixels. The histogram represents the distribution of pixel values. For example, the image may be a greyscale image having pixel values ranging from 0 (black) to 255 (white). The histogram determines the number of occurrences of pixels at each of the pixel values.

Pre-processing the images using the image histogram tool 180 includes the step of computing 408 a cumulative distribution function (CDF) based on the histogram. The CDF represents the cumulative values of the histogram. The CDF quantifies the probability of observing certain pixel intensities. Pre-processing the images using the image histogram tool 180 includes the step of calculating 410 enhanced lightness values of the images based on the cumulative distribution function to generate the enhanced images. The enhanced lightness values are calculated by multiplying the pixel values by a load factor. The load factor may be greater than 1 to increase the pixel values and shift the pixel values in a lighter direction. The load factor may be less than 1 to decrease the pixel values and shift the pixel values in a darker direction. Enhancing the lightness values distributes the pixel values across a wider range of pixel values to increase image contrast. Enhancing the lightness values changes the brightness of the image.

At 412, the method includes processing the enhanced images using the shape recognition tool 184 of the vision inspection controller 108. The shape recognition tool 184 may process the images by comparing the enhanced image to an image analysis model. The enhanced images may be processed by performing pattern recognition of the enhanced images, such as by performing feature extraction of boundaries and surfaces detected in the images and comparing the boundaries and surfaces to the image analysis model. The shape recognition tool 184 may process the enhanced images by performing OCR on the enhanced image.

Figure 5:
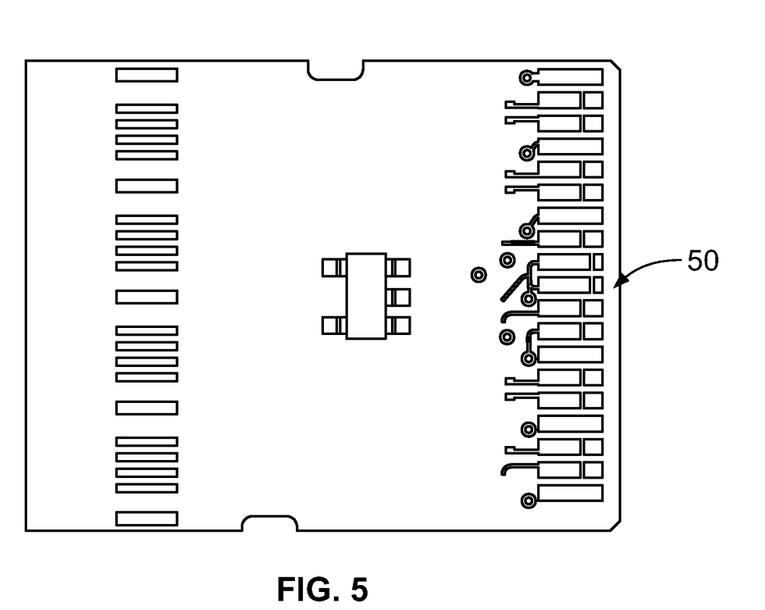
FIG. 5 illustrates an image of the part in accordance with an exemplary embodiment prior to processing the image using an image histogram tool.
Figure 6:
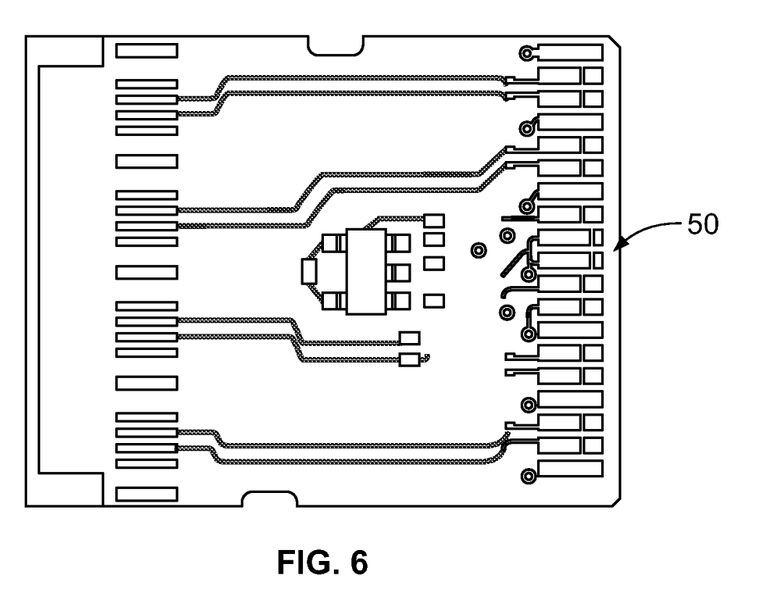
FIG. 6 illustrates an enhanced image of the part in accordance with an exemplary embodiment after processing the image using the image histogram tool.

FIG. 5 illustrates an image of the part 50 in accordance with an exemplary embodiment prior to processing the image using the image histogram tool 180. FIG. 6 illustrates an enhanced image of the part 50 in accordance with an exemplary embodiment after processing the image using the image histogram tool 180. The image shown in FIG. 6 has improved contrast compared to the image shown in FIG. 5. The image histogram tool 180 redistributes lightness values of the pixels of the image for improved contrast of the image.

Figure 7:
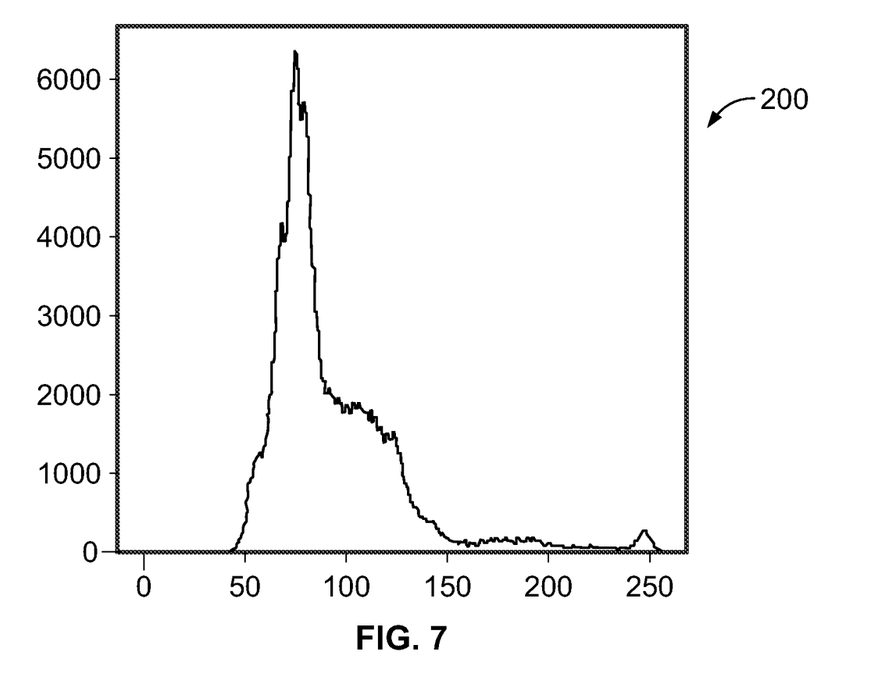
FIG. 7 illustrates a histogram of the image shown in FIG. 5 in accordance with an exemplary embodiment prior to redistribution of the pixel values using the image histogram tool.
Figure 8:
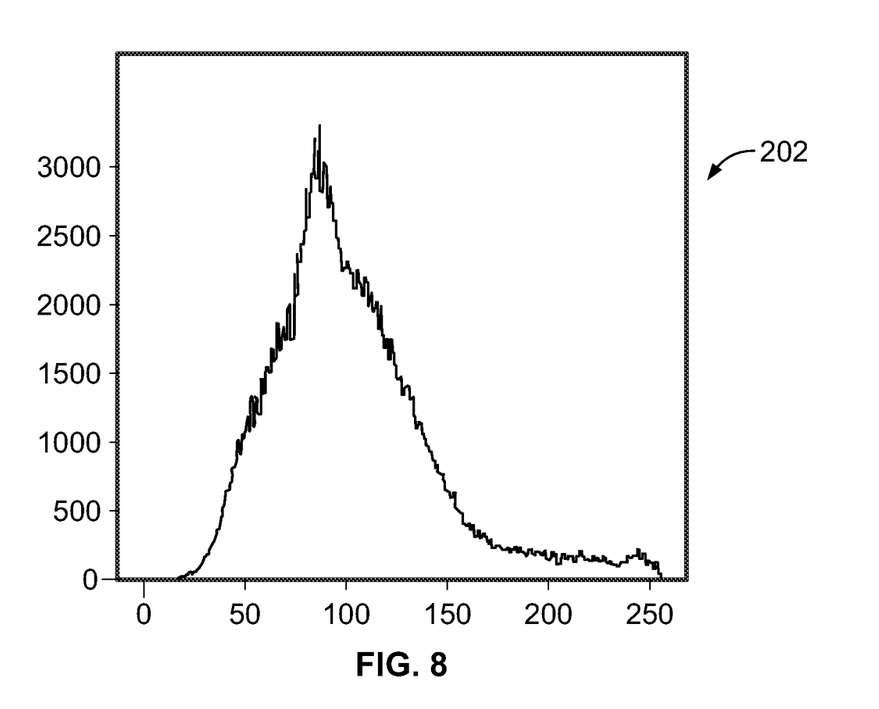
FIG. 8 illustrates a redistributed histogram of the image shown in FIG. 6 in accordance with an exemplary embodiment after processing the histogram using the image histogram tool to redistribute the pixel values.

FIG. 7 illustrates a histogram 200 of the image shown in FIG. 5 in accordance with an exemplary embodiment prior to redistribution of the pixel values using the image histogram tool 180. FIG. 8 illustrates a redistributed histogram 202 of the image shown in FIG. 6 in accordance with an exemplary embodiment after processing the histogram using the image histogram tool 180 to redistribute the pixel values. The histograms 200, 202 show the pixel values on the X-axis having a range of 0-255. The histograms 200, 202 show the number of occurrences of pixels at each of the pixel values on the Y-axis (FIG. 7 has a range of 0-6,000 whereas FIG. 8 has a range of 0-3,000). The redistributed histogram 202 shown in FIG. 8 has greater pixel value distribution, which increases image contrast.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vision inspection system comprising:
a sorting platform having an upper surface supporting parts for inspection;
an inspection station positioned adjacent the sorting platform, the inspection station including an imaging device to image the parts in a field of view above the upper surface; and
a vision inspection controller receiving images from the imaging device, the vision inspection controller including an image histogram tool pre-processing the images to improve contrast of the images by redistributing lightness values of the images based on adaptive histogram equalization processing to generate enhanced images that are different from the images received from the imaging device, the vision inspection controller processing the enhanced images, which are different from the images received from the imaging device, based on an image analysis model modeled corresponding to the enhanced images to determine inspection results for each of the parts, the vision inspection controller having an artificial intelligence learning module operated to customize and configure the image analysis model based on the enhanced images.

2. The vision inspection system of claim 1, wherein the image histogram tool computes a cumulative distribution function to redistribute the lightness values of the images.

3. The vision inspection system of claim 1, wherein the image histogram tool improves image contrast in the enhanced images compared to the original images received from the imaging device.

4. The vision inspection system of claim 1, wherein the image histogram tool generates a histogram, the image histogram tool computes a cumulative distribution function based on the histogram, and the image histogram tool calculates the enhanced lightness values of the images based on the cumulative distribution function to generate the enhanced images.

5. The vision inspection system of claim 1, wherein the adaptive histogram equalization processing uses contrast limited adaptive histogram equalization processing.

6. The vision inspection system of claim 1, wherein the image histogram tool compartmentalizes the image into tiles and performs the adaptive histogram equalization processing to each of the tiles to generate the enhanced images.

7. The vision inspection system of claim 1, wherein the image histogram tool performs local contrast image enhancement on different areas of the image to generate the enhanced images.

8. The vision inspection system of claim 1, wherein the vision inspection controller includes a shape recognition tool processing the enhanced images based on the image analysis module to determine the inspection results.

9. The vision inspection system of claim 8, wherein the shape recognition tool is used for optical character recognition of the enhanced images after the image histogram tool pre-processes the images.

10. The vision inspection system of claim 1, wherein the image histogram tool pre-processes the images to generate the enhanced images prior to the vision inspection controller saving the enhanced images.

11. The vision inspection system of claim 8, wherein the shape recognition tool is customized and configured by the artificial intelligence learning module.

12. The vision inspection system of claim 1, wherein the vision inspection controller includes a shape recognition tool analyzing the images to recognize features of the parts, the shape recognition tool being implemented based on an orientation offset determined by the shape recognition tool.

13. The vision inspection system of claim 1, further comprising a sorting device positioned adjacent the sorting platform, the sorting device including a part manipulator configured to interface with the parts for sorting the parts based on the inspection results.

14. The vision inspection system of claim 1, wherein the image analysis model changes over time based on input from the artificial intelligence learning module.

15. A vision inspection system comprising:
a sorting platform having an upper surface supporting parts for inspection;
an inspection station positioned adjacent the sorting platform, the inspection station including an imaging device to image the parts in a field of view above the upper surface; and
a vision inspection controller receiving images from the imaging device, the vision inspection controller including an image histogram tool pre-processing the images to improve contrast of the images, the image histogram tool generates a histogram, the image histogram tool computes a cumulative distribution function based on the histogram, the image histogram tool calculates enhanced lightness values of the images based on the cumulative distribution function to generate enhanced images that are different from the images received from the imaging device, the vision inspection controller including a shape recognition tool processing the enhanced images, which are different from the images received from the imaging device, based on an image analysis module modeled corresponding to the enhanced images to determine inspection results for each of the parts, the vision inspection controller having an artificial intelligence learning module operated to customize and configure the image analysis model based on the enhanced images.

16. The vision inspection system of claim 15, wherein the image histogram tool performs adaptive histogram equalization to redistribute the lightness values of the images.

17. The vision inspection system of claim 15, wherein the image histogram tool compartmentalizes the image into tiles and performs adaptive histogram equalization processing to each of the tiles to generate the enhanced images.

18. The vision inspection system of claim 15, wherein the shape recognition tool is used for optical character recognition of the enhanced images after the image histogram tool pre-processes the images.

19. A method of inspecting parts comprising:
loading the parts on an upper surface of a sorting platform;
imaging the parts at an inspection station positioned adjacent the sorting platform using an imaging device to image the parts on the upper surface;
receiving images from the imaging device at a vision inspection controller having an image histogram tool and a shape recognition tool;
pre-processing the images using the image histogram tool to improve contrast of the images by redistributing lightness values of the images based on adaptive histogram equalization processing to generate enhanced images that are different from the images received from the imaging device;
processing the enhanced images, which are different from the images received from the imaging device, using the shape recognition tool based on an image analysis module modeled corresponding to the enhanced images to determine inspection results for each of the parts; and
customizing the image analysis model using an artificial intelligence learning module to configure the image analysis model based on the enhanced images.

20. The method of claim 19, wherein pre-processing the images using the image histogram tool includes generating a histogram based on the image, computing a cumulative distribution function based on the histogram, and calculating enhanced lightness values of the images based on the cumulative distribution function to generate the enhanced images.

* * * * *